(12) United States Patent
Psenak et al.

(10) Patent No.: US 11,121,961 B2
(45) Date of Patent: Sep. 14, 2021

(54) SYSTEMS AND METHODS FOR DETERMINING SECURE NETWORK ELEMENTS USING FLEXIBLE ALGORITHM TECHNOLOGY

(71) Applicant: Cisco Technology, Inc., San Jose, CA (US)

(72) Inventors: Peter Psenak, Bratislava (SK); Paul William Wells, Eden Prairie, MN (US); Ketan Jivan Talaulikar, Pune (IN); Clarence Filsfils, Brussels (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 56 days.

(21) Appl. No.: 16/598,852

(22) Filed: Oct. 10, 2019

(65) Prior Publication Data

US 2020/0322254 A1 Oct. 8, 2020

Related U.S. Application Data

(60) Provisional application No. 62/829,584, filed on Apr. 4, 2019.

(51) Int. Cl.
*H04L 12/721* (2013.01)
*H04L 29/06* (2006.01)

(52) U.S. Cl.
CPC .......... *H04L 45/127* (2013.01); *H04L 63/205* (2013.01)

(58) Field of Classification Search
CPC .......................... H04L 45/127; H04L 63/205
See application file for complete search history.

(56) References Cited

U.S. PATENT DOCUMENTS 10,637,768 B1 * 4/2020 Joseph .................. H04L 12/721

FOREIGN PATENT DOCUMENTS

SE WO2019125238 * 6/2019 ........... H04L 12/751

OTHER PUBLICATIONS

Psenak, P. et al., "IGP Flexible Algorithm," https://tools.ietf.org/html/draft-ietf-lsr-flex-algo-01, dated Nov. 12, 2018, 24 pages.

* cited by examiner

*Primary Examiner* — Ronald B Abelson
(74) *Attorney, Agent, or Firm* — Baker Botts, LLP (57) ABSTRACT

In one embodiment, an apparatus includes one or more processors and one or more computer-readable non-transitory storage media coupled to the one or more processors. The one or more computer-readable non-transitory storage media include instructions that, when executed by the one or more processors, cause the apparatus to perform operations including receiving a first type-length-value (TLV) associated with a winning flexible algorithm definition (FAD) from a first element of a network. The operations also include determining a security level for the winning FAD based on the TLV. The operations further include determining a data transmission route through a plurality of elements of the network based on the security level for the winning FAD.

20 Claims, 4 Drawing Sheets

FIG. 1

IGP Flexible Algorithm 210

| | | |
|---|---|---|
| 200 → | Type: | Allocated by IANA |
| 225 → | Length: | Variable (dependent on the included Sub-TLVs) |
| 230 → | Flex-Algorithm: | Specifies a numeric identifier that represents a combination of calc-type, metric-type, and/or a set of constraints (value between 128 and 225 inclusive) |
| 235 → | Metric-Type: | Specifies the type of metric to be used during the calculation |
| 240 → | Calc-Type: | Specifies the type of calculation to be used (value between 0 to 127 inclusive) |
| 245 → | Priority: | Specifies the priority of the advertisement (value between 0 and 25 inclusive) |
| 250 → | Sub-TLV | |
| 255 → | Sub-TLV Value: | Specifies the security level (1 byte) |

SYSTEMS AND METHODS FOR DETERMINING SECURE NETWORK ELEMENTS USING FLEXIBLE ALGORITHM TECHNOLOGY

CROSS-REFERENCE TO RELATED APPLICATIONS

This application claims benefit of U.S. Provisional Application No. 62/829,584 filed Apr. 4, 2019, by Clarence Filsfils, and entitled "Using Attestation Procedures with Interior Gateway Protocol (IGP) Flexible Algorithm Technology," which is incorporated herein by reference.

TECHNICAL FIELD

This disclosure generally relates to determining secure network elements, and more specifically to systems and methods for determining secure network elements using flexible algorithm technology.

BACKGROUND

Sensitive information may be transmitted through one or more nodes within a network. Certain nodes within the network may become compromised. For example, an attacker may gain access to one or more of the network nodes. If a network node is compromised, traditional protections such as link encryption may prove ineffectual in protecting the sensitive information traversing the compromised node.

DESCRIPTION OF EXAMPLE EMBODIMENTS

Overview

According to an embodiment, an apparatus includes one or more processors and one or more computer-readable non-transitory storage media coupled to the one or more processors. The one or more computer-readable non-transitory storage media include instructions that, when executed by the one or more processors, cause the apparatus to perform operations including receiving a first type-length-value (TLV) associated with a winning FAD from a first element of a network. The operations also include determining a security level for the winning FAD based on the TLV. The operations further include determining a data transmission route through a plurality of elements of the network based on the security level for the winning FAD.

The operations of the embodiment may include determining that a second element of the network did not advertise an attestation sub-TLV and excluding the second element from the plurality of elements of the data transmission route. The second element may be a router. The operations may include determining that a second element of the network was advertised without a security-level sub-TLV and excluding the second element from the plurality of elements of the data transmission route, wherein the second element is a link between two nodes of the network. The operations may include determining that a prefix of the network was advertised without a security-level sub-TLV and excluding the prefix when determining the data transmission route through the plurality of elements of the network.

The operations of the embodiment may include receiving a second TLV associated with the winning FAD from a second element of the network, determining a security level for the second element of the network based on the second TLV, determining that the security level of the second element of the network is lower than the security level of the winning FAD, and excluding the second element when determining the data transmission route through the plurality of elements of the network. The second element may be one of the following: a link or a prefix. The TLV may be an Intermediate System to Intermediate System (ISIS) FAD sub-TLV or an Open Shortest Path First (OSPF) FAD TLV.

According to another embodiment, a method includes receiving a first TLV associated with a winning FAD from a first element of a network. The method also includes determining a security level for the winning FAD based on the TLV. The operations further include determining a data transmission route through a plurality of elements of the network based on the security level for the winning FAD.

According to yet another embodiment, one or more computer-readable non-transitory storage media embody instructions that, when executed by a processor, cause the processor to perform operations including receiving a first TLV associated with a winning FAD from a first element of a network. The operations also include determining a security level for the winning FAD based on the TLV. The operations further include determining a data transmission route through a plurality of elements of the network based on the security level for the winning FAD.

Technical advantages of certain embodiments of this disclosure may include one or more of the following. Certain systems and methods described herein use flexible algorithm technology to exclude potentially compromised network elements (e.g., nodes and links) from data transmission route calculations, which may prevent the leakage of sensitive information communicated within the network. Certain systems and methods described herein use flexible algorithm technology to determine data transmission routes through network elements that meet or exceed a predetermined security level threshold, which increases the trustworthiness of the network.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

In certain embodiments of this disclosure, a security level of a flexible algorithm is advertised in a FAD TLV using a security-level sub-TLV. One or more components of a network may determine a data transmission route through a plurality of network elements based on the security level of the FAD TLV. For example, a network element (e.g., a node, a link, or a prefix) may be excluded from the determination of the data transmission route if the network element does not advertise a security-level sub-TLV or if the network element advertises a security-level sub-TLV having a security level lower than the security level of the winning FAD.

Figure 1:
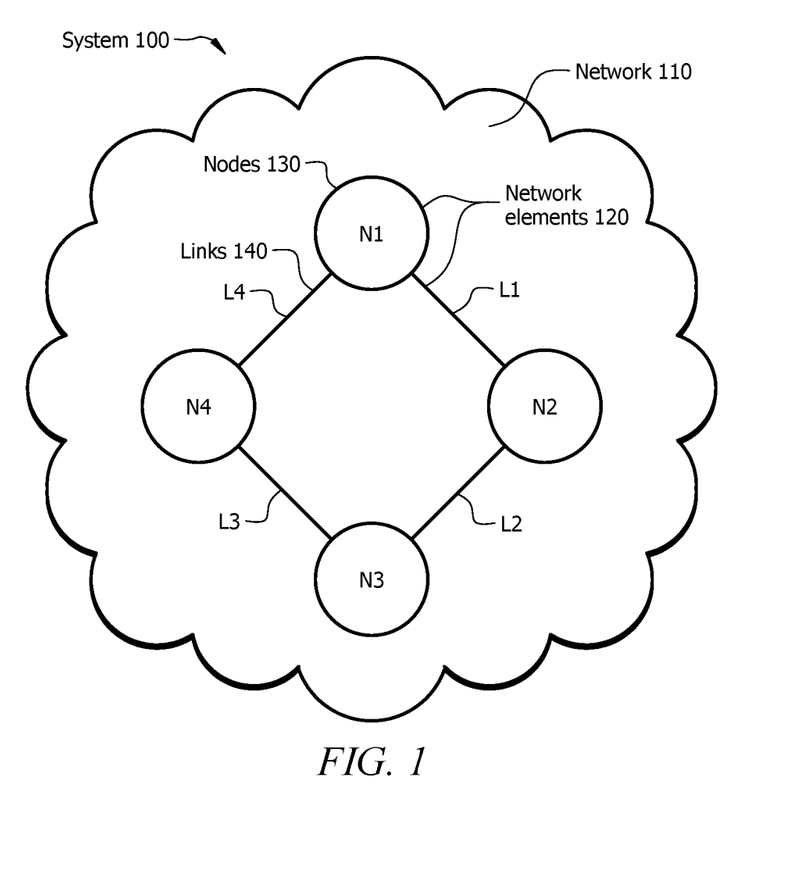
FIG. 1 illustrates a system for determining secure network elements using flexible algorithm technology, in accordance with certain embodiments.
Figure 2:
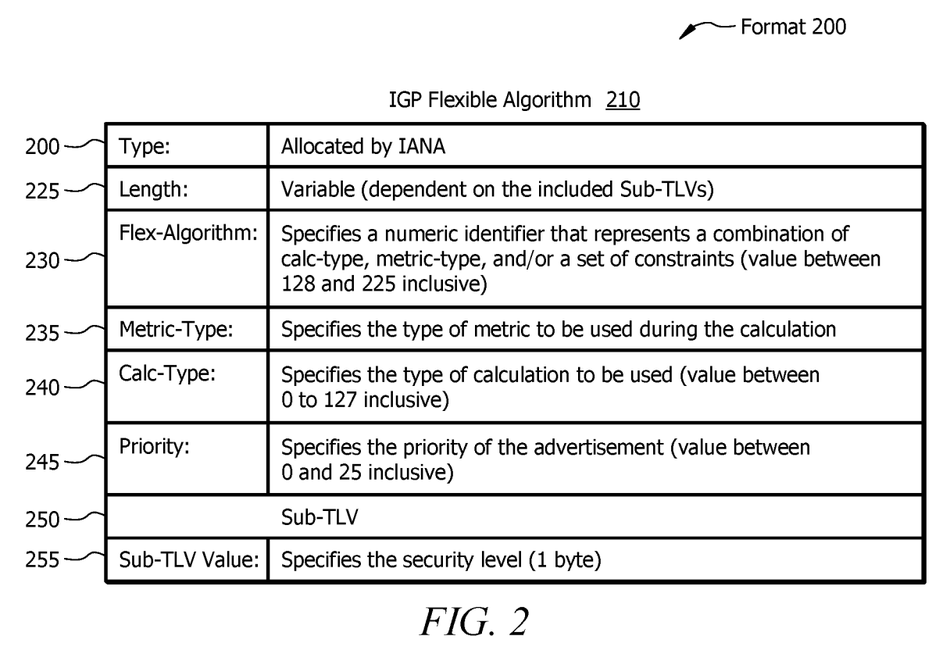
FIG. 2 illustrates a format for an interior gateway protocol (IGP) flexible algorithm that may be used by system 100 of FIG. 1, in accordance with certain embodiments.
Figure 3:
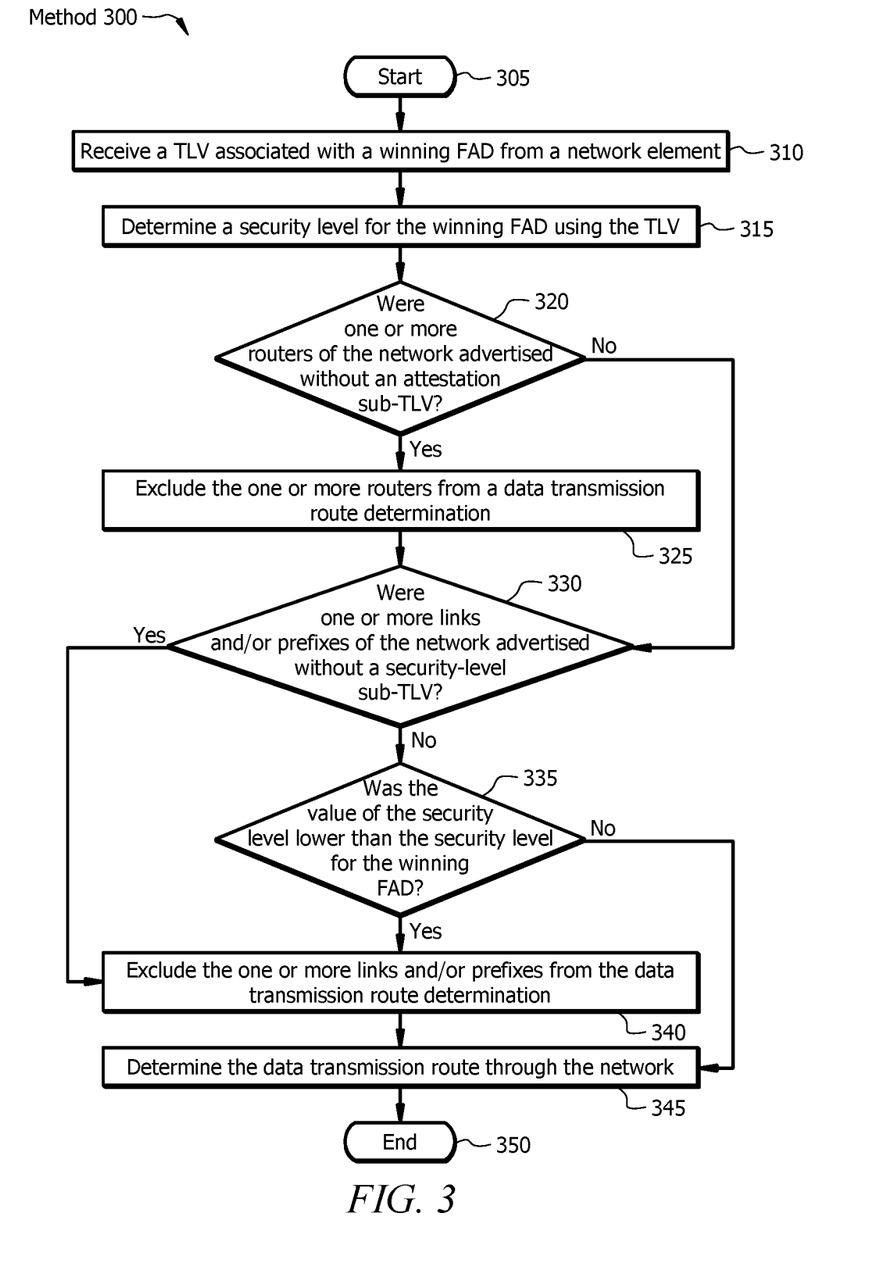
FIG. 3 illustrates a method for determining secure network elements using flexible algorithm technology, in accordance with certain embodiments.
Figure 4:
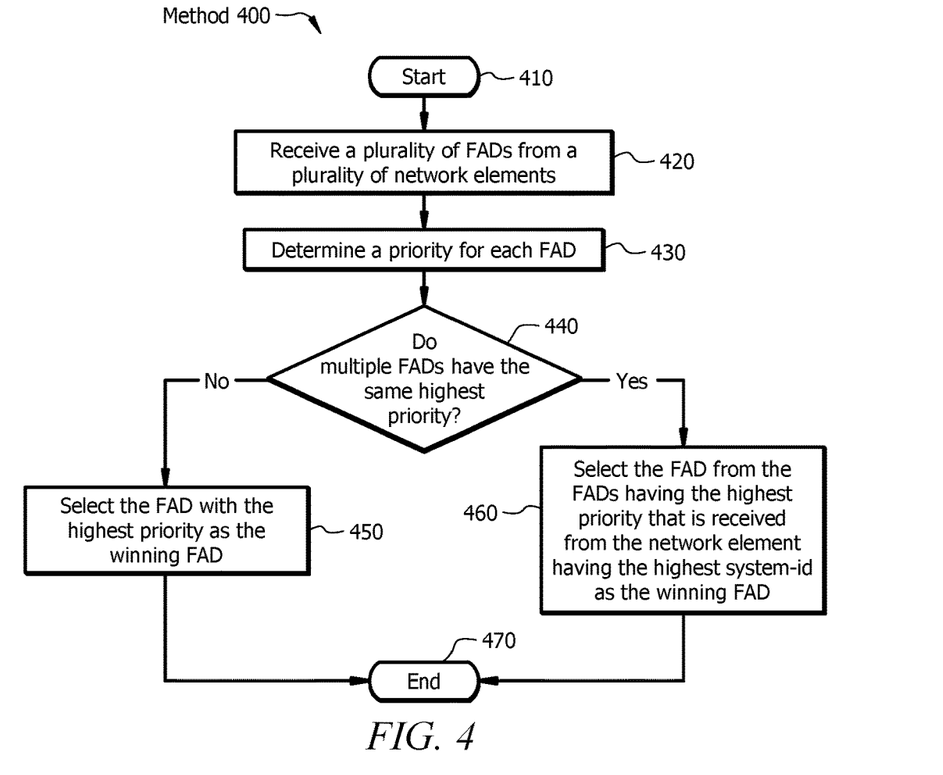
FIG. 4 illustrates a method for determining a winning flexible algorithm definition (FAD) that may be used by the method of FIG. 3, in accordance with certain embodiments.
Figure 5:
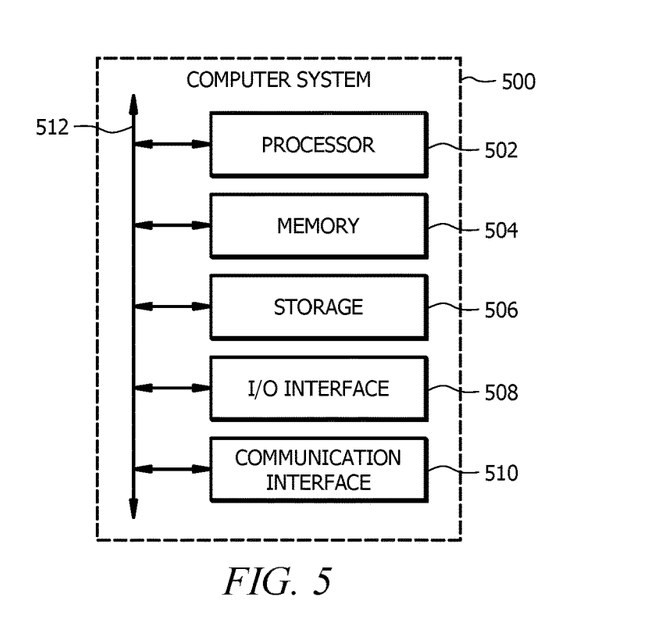
FIG. 5 illustrates a computer system, in accordance with certain embodiments.

FIG. 1 shows an example system for determining secure network elements using Flexible Algorithm technology, and FIG. 2 shows an example format for an IGP flexible algorithm that be used by system 100 of FIG. 1. FIG. 3 shows an example method for determining secure network elements using flexible algorithm technology, and FIG. 4 shows an example method for determining a winning FAD that may be used by the method of FIG. 3. FIG. 5 shows an example computer system that may be used by the systems and methods of FIGS. 1 through 4.

FIG. 1 illustrates an example system 100 for determining secure network elements using flexible algorithm technology. System 100 or portions thereof may be associated with an entity, which may include any entity, such as a business or company (e.g., a service provider) that determines secure network elements. The components of system 100 may include any suitable combination of hardware, firmware, and software. For example, the components of system 100 may use one or more components of the computer system of FIG. 5. System 100 of FIG. 1 includes a network 110 and network elements 120.

System 100 supports the usage of attestation procedures with IGP flexible algorithm technology. The IGP may be an OSPF routing protocol, an ISIS routing protocol, and the like. A FAD includes the following: (a) a calculation-type, (b) a metric-type; and (c) a set of constraints. Many possible constraints may be used to compute a path over one or more network elements 120 of network 110. System 100 provides a mechanism that allows one or more network elements 120 to: (a) identify a particular calculation-type; (b) identify a particular metric-type; (c) describe a particular set of constraints; and/or (d) assign a numeric identifier (e.g., flex-algorithm 230 of FIG. 2) to the combination of that calculation-type, metric-type, and/or particular set of constraints.

In particular embodiments, attestation procedures used by IGP may be used to extend the IGP flexible algorithm behaviors. For example, system 100 may extend the FAD to include a security level. The security level represents the minimal trustworthiness level required by the flexible algorithm. The security level of the flexible algorithm may be advertised in the FAD TLV using a security-level sub-TLV.

Network 110 of system 100 is any type of network that facilitates communication between components of system 100. Network 110 may connect one or more components of system 100. This disclosure contemplates any suitable network. For example, one or more portions of network 110 may include an ad-hoc network, an intranet, an extranet, a VPN, a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like.

Network elements 120 of system 100 are hardware, software, and protocols associated with network 110. Network elements 120 constitute the infrastructure of network 110. Network elements 120 include nodes 130. Nodes 130 receive, create, store and/or send data along a path of network 110. Nodes 130 may include one or more endpoints and/or one or more redistribution points that recognize, process, and forward data to other nodes 130. Nodes 130 may include virtual and/or physical network nodes. In certain embodiments, one or more nodes 130 include data communications equipment such as switches, bridges, modems, hubs, and the like. In some embodiments, one or more nodes 130 include data terminal equipment such as routers, servers, printers, workstations, and the like. Nodes 130 of system 100 include nodes N1, N2, N3, and N4.

Network elements 120 of system 100 include links 140. Links 140 are the physical and logical network components used to interconnect nodes 130. Links 140 of system 100 include links L1, L2, L3, and L4. Link L1 connects nodes N1 and N2, link L2 connects nodes N2 and N3, link L3 connects nodes N3 and N4, and link L4 connects nodes N4 and N1. Network elements 120 of system 100 may include prefixes. The prefixes may be advertised with prefix-segment IDs (SIDs) that are used to steer packets along constraint-based paths of network 110. Each SID may represent a path that is computed according to an identified flexible algorithm.

Each node 130 of system 100 may have instructions to send a packet to another node 130. Each node 130 may have several options for routing traffic through network 110. For example, node N1 may send the packet to node N2 via link L1 with instructions for node N2 to send the packet to node N3 via link L2. As another example, node N1 may send the packet to node N4 via link L4 with instructions to send the packet to node N3 via link L3. While both routes may be equally valid routes in a typical system, system 100 of FIG. 1 determines the data transmission route using a FAD that has been extended to include a security level, which excludes potentially compromised network elements from the data transmission route calculation.

One or more nodes 130 of network 110 may receive a security-level sub-TLV associated with a FAD and determine a security level of the FAD based on the security-level sub-TLV. A link state protocol data unit (LSP) may be used to advertise the security-level sub-TLV. If the LSP that advertised the security-level sub-TLV does not have a valid attestation TLV, then the FAD associated with the security-level sub-TLV is ignored.

One or more nodes 130 of network 110 may select a winning FAD that is used to determine secure network elements 120 of system 100. For example, node N1 of network 110 may receive a plurality of valid FADs from a plurality of nodes 130 of network 110. Node N1 may determine a priority of each of the valid FADs and select the FAD with the highest priority as the winning FAD. If multiple valid FADs have the same highest priority, node N1 may select the winning FAD from the FADs having the highest priority that is received from the network element having the highest system-id. For example, if valid FADs received from nodes N2 and N4 have the same highest priority, and node N2 has a higher system-id than node N4, then node N1 may select the FAD received from node N2 as the winning FAD.

One or more nodes 130 may be excluded from the data transmission route based on one or more conditions. For example, node N2 may be excluded from the route if node N2 does not advertise an attestation sub-TLV. As another example, link L2 may be excluded from the route if link L2 is advertised without a security level sub-TLV or if the value in the security level sub-TLV is less than the value of the security level of the winning FAD. As still another example, a prefix may be excluded from the data transmission route calculation if the prefix is advertised without a security level sub-TLV or if the value of the security level in the security level sub-TLV for the prefix is less than the value of the security level advertised in the winning FAD. In these instances, node N1 may follow the data transmission route through node N4 instead of node N2.

In particular embodiments, node N1 of network 110 supporting a trusted ISIS routing protocol (or a trusted OSPF routing protocol) may be configured to advertise its attestation capability. Through this function, node N1 may be capable of positively announcing to node N2 along link L1 and node N4 along link L4 of network 110 that it is capable of supporting attestation procedures in the ISIS or OSPF routing protocol. In particular embodiments, one or more nodes 130 may be configured to advertise an attestation TLV.

One or more nodes 130 may include a trusted computing infrastructure (e.g., a trusted platform module or other crypto-processor) and may append information provided by the trusted computing infrastructure to LSPs (or link state advertisements (LSAs) for OSPF) it sends through an attestation TLV. The attestation TLV may be appended to one or more LSPs originating in node 130 that supports the trusted ISIS (or OSPF) routing procedure. In this configuration, the LSPs may be propagated through network 110. For example, the LSPs may be sent to one or more Level-1 or Level-2 areas and devices as appropriate. In the illustrated embodiment of FIG. 1, an LSP sent from node N3 to node N4 along link L3 may be propagated to node N1 along link L4.

One or more nodes 130 of system 100 may be configured to advertise an attestation TLV to neighboring nodes 130 in network 110 through ISIS (or OSPF) Hello protocol data units (PDUs). For example, node N1 may be configured to send ISIS Hello PDUs to nodes N2 and N4 along links L1 and L4, respectively. Node N1 may be configured to append information provided by its trusted computing architecture to Hello PDUs issued by node N1 as an attestation TLV. The modified Hello PDU may allow nodes 130 that receive the Hello PDU (e.g., nodes N4 and N2) to determine the trustworthiness of the message of the Hello PDU as well as the trustworthiness of the adjacency implied by the issuance of a Hello PDU. In particular embodiments, any type of Hello PDUs may be augmented with the attestation TLV (e.g., point-to-point, Level-1, Level-2, etc.). Devices in the ISIS (or OSPF) routing protocol may be configured to ignore TLVs that they cannot process, so the addition of an attestation TLV to the Hello PDU may not impact devices that do not support attestation.

In particular embodiments, one or more nodes 130 may be configured to validate attestation TLVs received from ISIS (or OSPF) Hello PDUs from other nodes 130. One or more nodes 130 may be further configured to act based on the status of the validation according to a specified policy provided to node 130. For example, if the validation fails, node N4 may effectively ignore the Hello PDU. As another example, node N4 may refuse to acknowledge the adjacency match. As still another example, if the validation fails, the network node N4 may be configured to set a specified metric of the connection to a maximum value. As another example, if the validation fails, the network node N4 may approve the adjacency match.

In particular embodiments, one or more nodes 130 may be configured to advertise the trustworthiness of one or more links 140 or adjacency with one or more neighboring nodes 130 using a security-level sub-TLV. For example, node N4 may advertise the trustworthiness of link L3 or the adjacency of node N3. The security-level sub-TLV may comprise information to indicate one or more neighboring nodes 130 and information to indicate a trustworthiness level of that neighboring node 130. For example, node N4 may validate an attestation TLV received with a Hello PDU from neighboring node N3. The attestation TLV may fail the validation, and node N4 may determine to refuse to acknowledge the Hello PDU, as it has determined that neighboring node N3 is not trustworthy. Node N4 may further advertise that it has determined that neighboring node N3 is not trustworthy. For example, node N4 may advertise its conclusions to node N1 using link L4. This may reduce the likelihood of other nodes 130 in network 110 sending sensitive information to untrustworthy neighboring node N3.

In particular embodiments, one or more nodes 130 may be configured to advertise the trustworthiness of a prefix using a security-level sub-TLV. For example, node N4 in trusted network 110 may provide prefixes it has detected to neighboring nodes (e.g., node N1) across level and areas (e.g., if a level-2 node, it may provide to other level-2 nodes). A PDU sent to identify that prefix may be appended with a security-level sub-TLV to indicate a trustworthiness of the prefix based on the trustworthiness of node 130 originating the prefix. In particular embodiments, trustworthiness for local prefixes (e.g., prefixes on a particular node 130) advertised in an LSP may be determined based on a security level as determined from the security-level sub-TLV.

In particular embodiments, one or more nodes 130 may be configured to validate an attestation TLV received in an LSP from another node 130. For example, node N4 may use information from a trusted computing infrastructure to ascertain if the information in the LSPs should be treated as trustworthy or untrustworthy. Based on an attestation policy, node N4 may be further configured to accept or discard LSPs from other nodes 130 that fail to advertise valid attestation TLVs or that advertise invalid TLVs. The attestation policy may be locally configured, domain-wide, network wide, or have further scope as appropriate.

Specific techniques may be adopted throughout sections of network 110 based on how many nodes 130 support attestation TLVs. In particular embodiments, if all nodes (e.g., nodes N1, N2, N3, and N4) in an ISIS (or OSPF) routing protocol area support attestation TLVs and attestation procedures, the LSPs that failed an attestation validation may be excluded from network 110. For example, the LSP may be excluded during the calculation of the data transmission route.

In particular embodiments, one or more nodes 130 may track the degrees of trustworthiness of links 140 in a trusted network topology. The trustworthiness of links 140 may be determined based on a received security-level sub-TLV. The degree of trustworthiness may be incorporated into route calculations. For example, if two or more paths have equal cost (calculated in a standard way), the trustworthiness of links 140 may be used as a tiebreaker so that node 130 may choose the path with the highest degree of trustworthiness. As another example, the trustworthiness may be one of several factors considered when performing the cost calculations (e.g., as a part of a weighted combination). As another example, a network node may prioritize trustworthiness, and use only the degree of trustworthiness of node 130 or link 140 as a consideration when determining a route to use.

In particular embodiments, one or more network elements 120 may compare the security level of one or more elements of network 110 to a threshold security level. During the calculation of the data transmission route, network 110 may only consider network elements 120 with a security level above the threshold security level. For example, node N4 may refuse to consider one or more network elements 120 during data transmission route calculations that have security levels below the threshold security level. In certain embodiments, the threshold security level is the security level of the FAD used to determine secure network elements 120 of system 100.

In operation, node N1 of network 110 receives a security-level sub-TLV (e.g., an ISIS security-level sub-TLV or an OSPF security-level TLV) associated with a FAD from node N2 of network 110. Node N1 determines a security level for the FAD based on the received security-level TLV. Node N1 then determines which nodes 130 of network 110 were advertised without an attestation sub-TLV and excludes those nodes 130 from the data transmission route calculation. Node N1 determines which links and/or prefixes were advertised without a security-level sub-TLV and excludes those links and/or prefixes form the data transmission route calculation. For the links and/or prefixes advertised with a security-level sub-TLV, node N1 determines which links and/or prefixes have a security level lower than the security level for the FAD and excludes those links and/or prefixes from the data transmission route calculation. Node N1 then calculates the data transmission route using network elements 120 that have not been excluded from the calculation. As such, system 100 of FIG. 1 uses flexible algorithm technology to exclude potentially compromised network elements 120 (e.g., nodes 130, links 140, and prefixes) from data transmission route calculations, which may prevent the leakage of sensitive information communicated within network 110.

Although system 100 of FIG. 1 describes and illustrates particular network elements 120 performing particular actions, this disclosure contemplates any suitable network element 120 or combination thereof performing any suitable action. For example, node N3 may perform one or more actions described above for system 100. As another example, a network controller may perform one or more actions described above for system 100.

Although FIG. 1 illustrates a particular number of networks 110 and network elements 120, this disclosure contemplates any suitable number of networks 110 and network elements 120. For example, network 110 may include more or less than four nodes 130 and/or four links 140. Although FIG. 1 illustrates a particular arrangement of network 110 and network elements 120, this disclosure contemplates any suitable arrangement of network 110 and network elements 120.

FIG. 2 illustrates an example format 200 for an IGP flexible algorithm 210 that may be used by system 100 of FIG. 1. IGP flexible algorithm 210 may be advertised by a network element (e.g., network element 120 of FIG. 1). For example, IGP flexible algorithm may be advertised by an ISIS router or an OSPF router. Format 200 of IGP Flexible Algorithm 210 includes a type 220, a length 225, a flex-algorithm 230, a metric-type 235, a calc-type 240, a priority 245, a sub-TLV 250, and a sub-TLV value 255. Type 220 indicates the type of IGP flexible algorithm. Type 220 may be allocated by Internet Assigned Numbers Authority (LANA). Type 220 may vary depending on the routing protocol. For example, the value of type 220 may be 26 for an ISIS routing protocol. As another example, the value of type 220 may be 16 for an OSPF routing protocol.

Length 225 of IGP flexible algorithm 210 is variable depending on the included sub-TLVs. Flex-algorithm 230 of IGP flexible algorithm 210 is a numeric identifier that represents the combination of a calculation-type, a metric-type, and/or a particular set of constraints of a FAD. Flex-algorithm 230 may be a single octet value in the range of 128 to 255 that is associated via provisioning with the FAD. Metric-Type 235 of IGP flexible algorithm 210 represents a type of metric to be used (e.g., IGP metric, link delay, traffic engineering metric, etc.) during the data transmission route calculation. Calc-type 240 of IGP flexible algorithm 210 represents type of calculation to be used (e.g., shortest-path first (SPF), depth-first search (DFS), etc.) for the data transmission route calculation. Calc-type 240 of IGP flexible algorithm 210 represents the type of calculation to be used by IGP algorithm 210. Calc-type 240 may be a value in the range of 0 to 127. If the required calculation type is shortest path first, calc-type 240 is set to 0. Priority 245 specifies the priority of the advertisement. Priority 245 is a value in the range of 0 to 255.

Sub-TLV 250 is a FAD sub-TLV that specifies a security level that may be used by system 100 of FIG. 1 to ascertain if a network element has been compromised. Sub-TLV 250 may be used in an ISIS routing protocol, an OSPF routing protocol, and the like. Sub-TLV value 255 specifies the security level of the FAD or the network element. Sub-TLV value 255 may be 1 byte. Modifications, additions, or omissions may be made to format 200 of IGP flexible algorithm 210 depicted in FIG. 2. For example, format 200 may include more or less than one sub-TLV 250.

FIG. 3 illustrates an example method 300 for determining secure network elements using flexible algorithm technology. Method 300 begins at step 305. At step 310, an element of a network (e.g., network 110 of FIG. 1) receives a TLV associated with a winning FAD from another network element of the network. For example, node N1 of FIG. 1 may receive an ISIS FAD Sub-TLV or an OSPF FAD TLV from adjacent node N2 of FIG. 1. The winning FAD may be selected in accordance with method 400 of FIG. 4 below. Method 300 then moves from step 310 to step 315. At step 315, the network element determines a security level for the winning FAD using the TLV. The security level may be advertised in the sub-TLV (e.g., the ISIS FAD Sub-TLV or the OSPF FAD TLV) of the FAD. The security level may be represented as a value (e.g., value 255 of FIG. 2). Method 300 then moves from step 315 to step 320.

At step 320, the network element determines whether one or more routers of the network were advertised without an attestation sub-TLV. If one or more of the routers were advertised without an attestation sub-TLV, method 300 moves from step 320 to step 325, where each router advertised without an attestation sub-TLV is excluded from a data transmission route determination. Method 300 them moves from step 325 to step 330. If one or more of the routers were advertised with an attestation sub-TLV, method 300 advances from step 320 to step 330.

At step 330, the network element determines whether one or more links and/or prefixes were advertised without a security-level sub-TLV (e.g., a security-level ISIS FAD Sub-TLV or a security-level OSPF FAD TLV.) If one or more of the links and/or prefixes were advertised without a security-level sub-TLV, method 300 advances from step 330 to step 340, where each link and/or prefix advertised without a security-level sub-TLV is excluded from the data transmission route calculation. If one or more of the links and/or prefixes were advertised with a security-level sub-TLV, method 300 moves from step 330 to step 335, where the network element determines whether the value of the security level of each link and/or prefix is lower than the security level for the winning FAD as determined in step 315.

If, at step 335, the value of the security level of each link and/or prefix is lower than the winning FAD security level determined in step 315, method 300 moves from step 335 to step 340, where each link and/or prefix with a security level lower than the FAD security level is excluded from the data transmission route calculation. Method 300 then moves from step 340 to step 345. If, at step 335, the value of the security level of each link and/or prefix is greater than or equal to the winning FAD security level determined in step 315, method 300 advances from step 335 to step 345. At step 345, the network element determines the data transmission route through the network. Method 300 then moves from step 345 to step 350, where method 300 ends. As such, method 300 determines secure network elements using flexible algorithm technology by excluding one or more potentially compromised network elements (e.g., nodes, links, and/or prefixes) from the data transmission route calculation.

Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates an example method 300 for determining secure network elements using flexible algorithm technology including the particular steps of the method of FIG. 3, this disclosure contemplates any suitable method 300 for determining secure network elements using flexible algorithm technology, including any suitable steps, which may include all, some, or none of the steps of the method of FIG. 3, where appropriate. Although this disclosure describes and illustrates particular components, devices, or systems carrying out particular steps of method 300 of FIG. 3, this disclosure contemplates any suitable combination of any suitable components, devices, or systems carrying out any suitable steps of method 300 of FIG. 3. For example, a network controller may perform one or more of the steps of method 300.

FIG. 4 illustrates an example method 400 for determining a winning FAD that may be used by the method of FIG. 3. Method 400 begins at step 410. At step 420, an element of a network (e.g., network 110 of FIG. 1) receives a plurality of valid FADs from a plurality of network elements of the network. For example, node N1 of FIG. 1 may receive FADs from nodes N2 and N4 of FIG. 1. Method 400 then moves from step 420 to step 430.

At step 430, the network element determines a priority of each valid FAD. For example, each FAD may include a priority value (e.g., priority 245 of FIG. 2) in its format (e.g., format 200 of IGP Flexible Algorithm 210 of FIG. 2). The priority value specifies the priority of the advertisement. The priority value may be within a range of 0 to 255. Method 400 then moves from step 430 to step 440. At step 440, the network element determines whether multiple FADs have the same highest priority. For example, the network element may determine that FADs received from nodes N2 and N4 of FIG. 1 have the same priority and that the priority of nodes N2 and N4 is higher than the priority of the FADs received from other nodes of network 110 of FIG. 1.

If, at step 440, the network element determines that multiple FADs do not have the same highest priority, method 400 moves from step 440 to step 450, where the FAD with the highest priority is selected as the winning FAD. If, at step 440, the network element determines that multiple FADs have the same highest priority, method 400 moves from step 440 to step 460. At step 460, the winning FAD is selected from the FADs having the highest priority that is received from the network element having the highest system-id. For example, if FADs received from nodes N2 and N4 of FIG. 1 have the same highest priority, and node N2 has a higher system-id than node N4, then FAD received from node N2 is selected as the winning FAD. Method 400 then moves from steps 450 and 460 to step 470, where method 400 ends.

As such, method 400 determines a winning FAD that may be used to determine a data transmission route through a network. For example, the winning FAD of FIG. 4 may be the FAD received in step 310 in FIG. 3 above, which is used to determine the data transmission route through the network at step 345.

Although this disclosure describes and illustrates particular steps of method 400 of FIG. 4 as occurring in a particular order, this disclosure contemplates any suitable steps of method 400 of FIG. 4 occurring in any suitable order. For example, step 430 a directed to determining whether a security level of the FAD is advertised in the TLV may be performed after step 440 directed to determining whether the LSP that advertised the TLV has a valid attestation TLV. Although this disclosure describes and illustrates an example method 400 for determining a FAD including the particular steps of the method of FIG. 4, this disclosure contemplates any suitable method 400 for determining a FAD, including any suitable steps, which may include all, some, or none of the steps of the method of FIG. 4, where appropriate. Although this disclosure describes and illustrates particular components, devices, or systems carrying out particular steps of method 400 of FIG. 4, this disclosure contemplates any suitable combination of any suitable components, devices, or systems carrying out any suitable steps of method 400 of FIG. 4. For example, a network controller may perform one or more of the steps of method 400.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. An apparatus, comprising:
one or more processors; and
one or more computer-readable non-transitory storage media coupled to the one or more processors and comprising instructions that, when executed by the one or more processors, cause the apparatus to perform operations comprising:
receiving a first type-length-value (TLV) associated with a winning flexible algorithm definition (FAD) from a first element of a network;
determining a security level for the winning FAD based on the TLV;
determining a data transmission route through a plurality of elements of the network based on the security level for the winning FAD;
determining that a second element of the network did not advertise an attestation sub-TLV; and
excluding the second element from the plurality of elements of the data transmission route.

2. The apparatus of claim 1, wherein the second element is a router.

3. The apparatus of claim 1, the operations further comprising:
determining that a third element of the network was advertised without a security-level sub-TLV; and
excluding the third element from the plurality of elements of the data transmission route, wherein the third element is a link between two nodes of the network.

4. The apparatus of claim 1, the operations further comprising:
determining that a prefix of the network was advertised without a security-level sub-TLV; and
excluding the prefix when determining the data transmission route through the plurality of elements of the network.

5. The apparatus of claim 1, the operations further comprising:
receiving a second TLV associated with the winning FAD from a third element of the network;
determining a security level for the third element of the network based on the second TLV;
determining that the security level of the third element of the network is lower than the security level of the winning FAD; and
excluding the third element when determining the data transmission route through the plurality of elements of the network, wherein the third element is one of the following:
a link; or
a prefix.

6. The apparatus of claim 1, wherein the TLV is an Intermediate System to Intermediate System (ISIS) FAD sub-TLV.

7. The apparatus of claim 1, wherein the TLV is an Open Shortest Path First (OSPF) FAD TLV.

8. A method, comprising:
receiving a first type-length-value (TLV) associated with a winning flexible algorithm definition (FAD) from a first element of a network;
determining a security level for the winning FAD based on the TLV;
determining a data transmission route through a plurality of elements of the network based on the security level for the winning FAD;
determining that a second element of the network did not advertise an attestation sub-TLV; and
excluding the second element from the plurality of elements of the data transmission route.

9. The method of claim 8, wherein the second element is a router.

10. The method of claim 8, further comprising:
determining that a third element of the network was advertised without a security-level sub-TLV; and
excluding the third element from the plurality of elements of the data transmission route, wherein the third element is a link between two nodes of the network.

11. The method of claim 8, further comprising:
determining that a prefix of the network was advertised without a security-level sub-TLV; and
excluding the prefix when determining the data transmission route through the plurality of elements of the network.

12. The method of claim 8, further comprising:
receiving a second TLV associated with the winning FAD from a third element of the network;
determining a security level for the third element of the network based on the second TLV;
determining that the security level of the third element of the network is lower than the security level of the winning FAD; and
excluding the third element when determining the data transmission route through the plurality of elements of the network, wherein the third element is one of the following:
a link; or
a prefix.

13. The method of claim 8, wherein the TLV is an Intermediate System to Intermediate System (ISIS) FAD Sub-TLV.

14. The method of claim 8, wherein the TLV is an Open Shortest Path First (OSPF) FAD TLV.

15. One or more computer-readable non-transitory storage media embodying instructions that, when executed by a processor, cause the processor to perform operations comprising:
receiving a first type-length-value (TLV) associated with a winning flexible algorithm definition (FAD) from a first element of a network;
determining a security level for the winning FAD based on the TLV;
determining a data transmission route through a plurality of elements of the network based on the security level for the winning FAD;
determining that a second element of the network did not advertise an attestation sub-TLV; and
excluding the second element from the plurality of elements of the data transmission route.

16. The one or more computer-readable non-transitory storage media of claim 15, wherein the second element is a router.

17. The one or more computer-readable non-transitory storage media of claim 15, the operations further comprising:
determining that a third element of the network was advertised without a security-level sub-TLV; and
excluding the third element from the plurality of elements of the data transmission route, wherein the third element is a link between two nodes of the network.

18. The one or more computer-readable non-transitory storage media of claim 15, the operations further comprising:
determining that a prefix of the network was advertised without a security-level sub-TLV; and excluding the prefix when determining the data transmission route through the plurality of elements of the network.

19. The one or more computer-readable non-transitory storage media of claim 15, the operations further comprising:
- receiving a second TLV associated with the winning FAD from a third element of the network;
- determining a security level for the third element of the network based on the second TLV;
- determining that the security level of the third element of the network is lower than the security level of the winning FAD; and
- excluding the third element when determining the data transmission route through the plurality of elements of the network, wherein the third element is one of the following:
  - a link; or
  - a prefix.

20. The one or more computer-readable non-transitory storage media of claim 15, wherein the TLV is one of the following:
- an Intermediate System to Intermediate System (ISIS) FAD Sub-TLV; or
- an Open Shortest Path First (OSPF) FAD TLV.

\* \* \* \* \*